US 6,688,015 B2

(12) United States Patent
Schroeder et al.

(10) Patent No.: US 6,688,015 B2
(45) Date of Patent: Feb. 10, 2004

(54) SYSTEM AND METHOD FOR SELECTION OF WHEEL BEARINGS

(75) Inventors: Harry E. Schroeder, Fayetteville, GA (US); James M. Patterson, Newnan, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 38 days.

(21) Appl. No.: 09/888,833

(22) Filed: Jun. 25, 2001

(65) Prior Publication Data

US 2002/0144419 A1 Oct. 10, 2002

Related U.S. Application Data

(60) Provisional application No. 60/281,834, filed on Apr. 5, 2001.

(51) Int. Cl.[7] .............................. G01B 3/34; B65D 85/58
(52) U.S. Cl. ...................... 33/501.08; 33/517; 33/555.1; 206/303; 206/318; 206/815
(58) Field of Search ........................ 33/501.05, 501.08, 33/501.09, 501.45, 562, 600, 679.1, 517, 545, 546, 549, 551, 555.1, 555.2; 206/318, 303, 815, 445, 461

(56) References Cited

U.S. PATENT DOCUMENTS

| | | | | | |
|---|---|---|---|---|---|
| 2,350,415 A | * | 6/1944 | Paulsen | .................... | 33/501.45 |
| 2,564,601 A | * | 8/1951 | Huot | .......................... | 206/379 |
| 2,896,333 A | * | 7/1959 | Kivela | ....................... | 33/555.2 |
| 3,127,986 A | * | 4/1964 | Hulka | ........................ | 33/555.2 |
| 4,138,820 A | * | 2/1979 | O'Connor | .................. | 33/555.2 |
| 4,170,069 A | * | 10/1979 | Katsanevas | ................ | 33/555.2 |
| 4,412,462 A | * | 11/1983 | McGavin | ................ | 33/501.45 |
| 4,499,994 A | * | 2/1985 | Rentch | ....................... | 206/303 |
| 4,501,361 A | * | 2/1985 | Rose, Jr. | ..................... | 206/303 |
| 4,846,343 A | * | 7/1989 | Rupert | ....................... | 206/303 |
| 5,020,662 A | * | 6/1991 | Aida | .......................... | 206/815 |
| 5,048,700 A | * | 9/1991 | Feder | ........................ | 33/555.2 |
| 5,078,266 A | * | 1/1992 | Rackley | ...................... | 206/815 |
| 5,131,162 A | * | 7/1992 | Miller | ....................... | 33/555.2 |
| 5,503,858 A | * | 4/1996 | Reskow | ...................... | 206/815 |
| 5,505,299 A | * | 4/1996 | Ditzig et al. | ................ | 206/815 |
| 5,680,709 A | * | 10/1997 | Stone | .......................... | 33/562 |
| 5,755,323 A | * | 5/1998 | Zahn et al. | ................. | 206/318 |
| 5,896,996 A | * | 4/1999 | Chuang | ..................... | 206/318 |

* cited by examiner

*Primary Examiner*—Diego Gutierrez
*Assistant Examiner*—Madeline Gonzalez
(74) *Attorney, Agent, or Firm*—King & Spalding LLP

(57) ABSTRACT

Ensuring that the correct wheel bearing is installed in the wheel assembly of an aircraft. A plastic mold is designed to hold only one size of wheel bearing. The mold is labeled with the wheel bearing serial number and the corresponding aircraft model number. Because only one size of wheel bearing fits properly in the mold, it facilitates identification and use of the correct size wheel bearing in the aircraft wheel assembly. The mold can be used to ship wheel bearings to air carriers and to store wheel bearings before installation into aircraft wheel assemblies. The mold also offers protection for the wheel bearing from contamination or damage.

39 Claims, 12 Drawing Sheets

SYSTEM AND METHOD FOR SELECTION OF WHEEL BEARINGS

RELATED APPLICATION

The present application claims priority to U.S. provisional application entitled System and Method for Selection of Wheel Bearings for Aircraft, filed on Apr. 5, 2001, having Ser. No. 60/281,834.

TECHNICAL FIELD

The present invention is generally directed to ensuring selection of the correct-size wheel bearing. Specifically, the present invention provides an apparatus for correctly identifying and storing wheel bearings and a method for using that apparatus.

BACKGROUND OF THE INVENTION

Wheel bearings are manufactured in a variety of different sizes. However, different sizes of wheel bearings can often have very similar dimensions. The similarity between different size wheel bearings can result in the use of the wrong type of wheel bearing in a wheel assembly. This problem is of particular importance in the airline industry. Different models of aircraft usually require different types of wheel bearings in their wheel assemblies. Typically, there are many different types of wheel bearings to choose from in selecting the correct type for a particular model of aircraft. In most aircraft, there are two wheel bearings in each wheel assembly, one called the inboard bearing (IB) and the other the outboard bearing (OB). Not only does bearing size vary among aircraft models, but each wheel bearing in the pair within a wheel assembly is generally a different size.

There can be five variables that distinguish the different types of wheel bearings. The five variables are the (1) outside diameter of the wheel bearing, (2) the inside diameter of the wheel bearing, (3) the number of rollers, (4) the taper angle of the outer circumference of the bearing, and (5) the height of the bearing. Generally, at least four of these five potential variables are required to be known to distinguish one bearing from another. Of the different types of bearings, several are so close in size that the differences in their dimensions are not easily discernable with the human eye. Although many of the bearings are very close in size, it is essential that a mechanic use a bearing of the correct size in the wheel assembly. Using a bearing that is only slightly different from the correct size bearing can cause a failure in the bearing due to the significant stress in the wheel assembly during take-off and landing of aircraft.

Each of the different types of bearings are stamped with a serial number that identifies the bearing. In the conventional approach to selecting the correct bearing, the mechanic checks the serial number on each bearing before installing it in the wheel assembly. The problem with this approach is that humans occasionally make errors and could inaccurately read the serial number stamped on the bearing. This potential for inaccuracy is compounded by the fact that the serial numbers used on typical aircraft wheel bearings are generally several digits long and use many of the same digits. One attempt at solving this problem was the use of a "go-no go" gauge. The "go-no go" gauge was simply a piece of material cut to the size of the inside diameter of a particular wheel bearing. When selecting a wheel bearing, a mechanic would slide the wheel bearing onto the "go-no go" gauge to insure that it was the correct size. However, the "go-no go" gauge is limited in that it only measures one of the five potential variables that distinguish wheel bearings. For example, a mechanic could use a wheel bearing with the correct inside diameter, according to the "go-no go" gauge, but an incorrect outside diameter.

In view of the foregoing, there is a need in the art for an apparatus that can accurately differentiate various sizes of wheel bearings. There is a further need for an apparatus that protects a wheel bearing from damage or contamination while it is stored until subsequent use in a wheel assembly. There is also a need for a method for efficiently employing the apparatus in a machine shop environment where wheel assemblies are taken apart and reconstructed. The present invention can facilitate selection of the correct size of wheel bearing for insertion in the wheel assembly of an aircraft.

SUMMARY OF INVENTION

The present invention comprises a device and method for insuring that a mechanic uses the correct size wheel bearing in an aircraft wheel assembly. For one aspect, the invention comprises a mold with one or more recesses that accurately fit to the dimensions of a particular wheel bearing. The mold can be made of any material that can be easily shaped such as plastic or sheet metal. Accordingly, molds can be created with different size recesses for each type of wheel bearing and only one wheel bearing can fit in each recess in a mold. If any of the variables that distinguish a wheel bearing do not correspond to the mold, the wheel bearing will not properly fit within the recess and it will be apparent to the mechanic that it is a bearing of incorrect size.

For another aspect, the invention comprises a mold with a circular recess shaped to fit only one size of wheel bearing. The recess comprises an outer wall contoured to fit the rollers of the wheel bearing. The recess also comprises a hub at the center of the recess. The recess can be designed such that the top surface of the hub is level with the top surface of the wheel bearing when a wheel bearing of the correct size is placed in the recess. The mold can also comprise finger recesses to facilitate removal of the wheel bearing from the recess. A removable cover can be attached to the mold to protect the wheel bearing while it sits in the mold. Markings on the mold can identify the serial number and type of wheel bearing and the type of aircraft it is designed for.

For yet another aspect, the present invention comprises a system for storing a wheel bearing in a wheel bearing mold until it is needed for a wheel assembly. The wheel bearing can be either a new bearing from the manufacturer or a recycled bearing previously used in another wheel assembly. The system comprises packaging the wheel bearing in a mold with a cover and storing the packaged wheel bearing in a rack of wheel bearings of the same size.

In yet another aspect, the present invention comprises a method that facilitates installing the correct size wheel bearing in a wheel assembly. When a mechanic needs a wheel bearing, she can select a wheel bearing mold from a rack of wheel bearings of the desired size. The wheel bearing model number and vehicle model can be printed on the mold for verifying that it is correct. The mechanic can remove the correct wheel bearing from the mold and install it in the wheel assembly.

These and other aspects of the invention will be described below in connection with the drawing set and the appended specification and claim set.

DETAILED DESCRIPTION OF THE EXEMPLARY EMBODIMENTS

Figure 1:
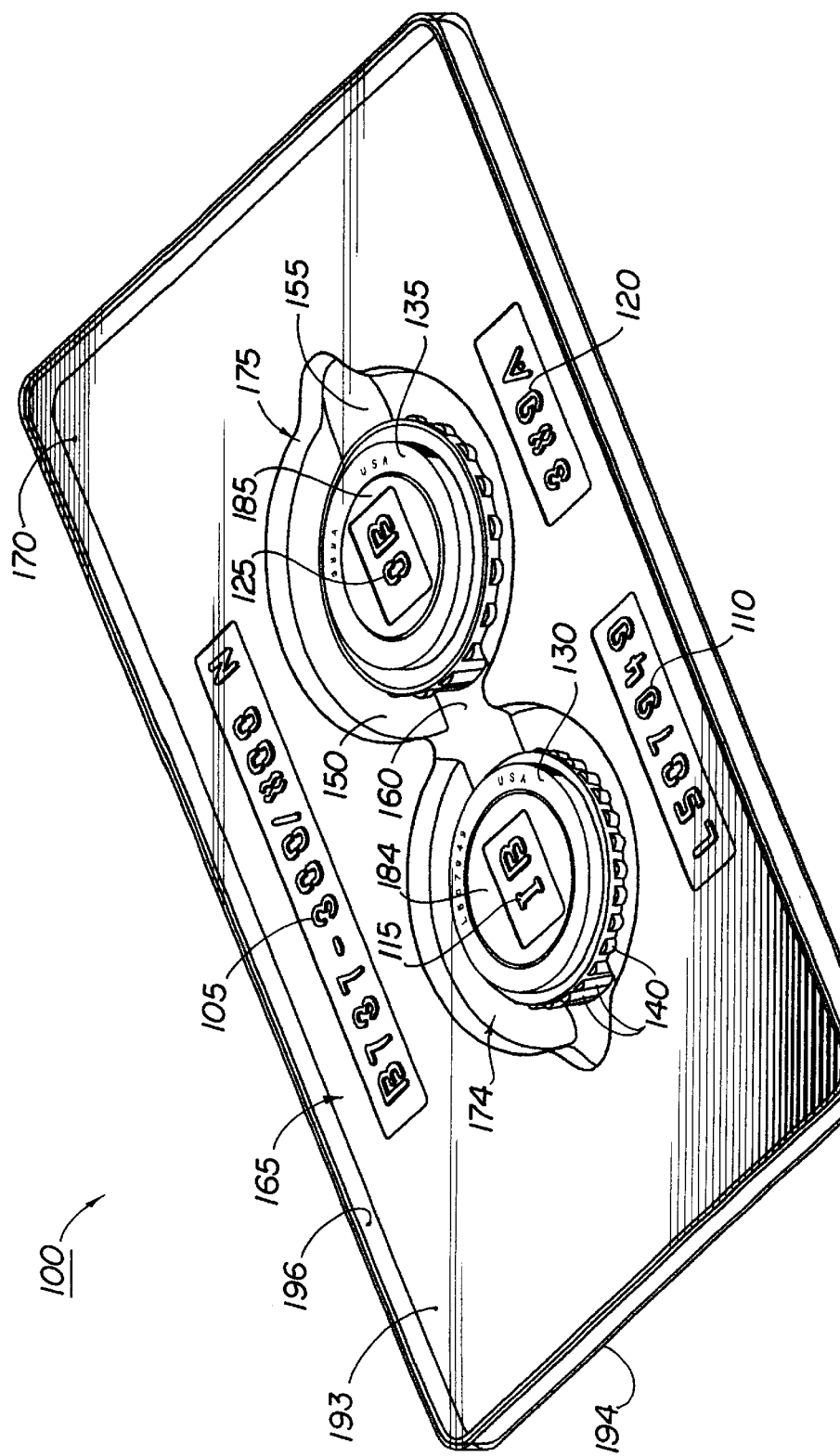
FIG. 1 illustrates a top view of an exemplary wheel bearing mold with recesses for an inboard and outboard wheel bearing.

The present invention comprises an apparatus and system for facilitating selection and insertion of the correct size wheel bearing in wheel assemblies. The various wheel bearings used in wheel assemblies are often very close in size. This proximity in size can result in the wrong size of wheel bearing being used in a wheel assembly. The present invention comprises a mold designed to clearly identify the size of the wheel bearing and the wheel assembly in which it is to be used. The mold also serves as a means for storing the wheel bearing and protecting it from damage or contamination. The invention further comprises a method for utilizing the mold in a system for storing wheel bearings until they are needed for installation in a wheel assembly. Finally, the invention also comprises a system for selecting the correct wheel bearing for installation using the mold.

Although the exemplary embodiments will generally be described in the context of wheel bearings installed on aircraft wheel assemblies, the present invention can be implemented in other types of machinery and vehicles that employ wheel bearings such as commercial trucking. The present invention can also be used for facilitating the identification of machine parts other than wheel bearings.

Referring now to the drawings, in which like numerals represent like elements throughout the several figures, exemplary embodiments of the present invention and the preferred environment in which it can be used will be described. The following discussion is representative and concerns applying the invention to aircraft.

Referring to FIG. 1, an exemplary packed wheel bearing mold 100 is illustrated. The wheel bearing mold comprises a base 165 and a cover 170. The base 165 comprises a top surface 193 and a bottom surface 194 (not visible in FIG. 1). The base 165 also comprises a ridge 196 along the perimeter of the mold. The ridge provides added stability to the mold by making it more rigid. The wheel bearing mold further comprises an aircraft model number 105, and bearing serial numbers 110 and 120. Generally, the aircraft model number 105 and bearing serial numbers 110 and 120 are stamped permanently into the base 165 so that they cannot be removed. In the packed wheel bearing mold illustrated in FIG. 1, outboard bearing 135 and inboard bearing 130 are resting in recesses, otherwise described as form regions, 174 and 175 within the base 165.

A recess 175 comprises an intermediate recess surface 150, outer finger notches 155 and 160, and a recess bottom surface 180 (not visible in FIG. 1) on which wheel bearing 135 sits. The outer finger notches 155 and 160 enable removal of the wheel bearing from the base 165. In one embodiment of the present invention, the outer finger notches 155 and 160 are defined by surfaces contiguous with the recess bottom surface 180, otherwise described as the form bottom surface, in order to reduce vacuum between the wheel bearing 135 and the base 165. The recesses 174 and 175 further comprise hubs defined by inner recess walls 181 and 182 and hub top surfaces 184 and 185. The hub top surfaces 184 and 185 are flush with the top surface of the bearings 134 and 135 when the correct bearings are placed in the recesses 174 and 175. "OB" 125 for outboard bearing and "IB" 115 for inboard bearing are also stamped into the mold at the hub top surfaces 184 and 185.

Figure 2A:
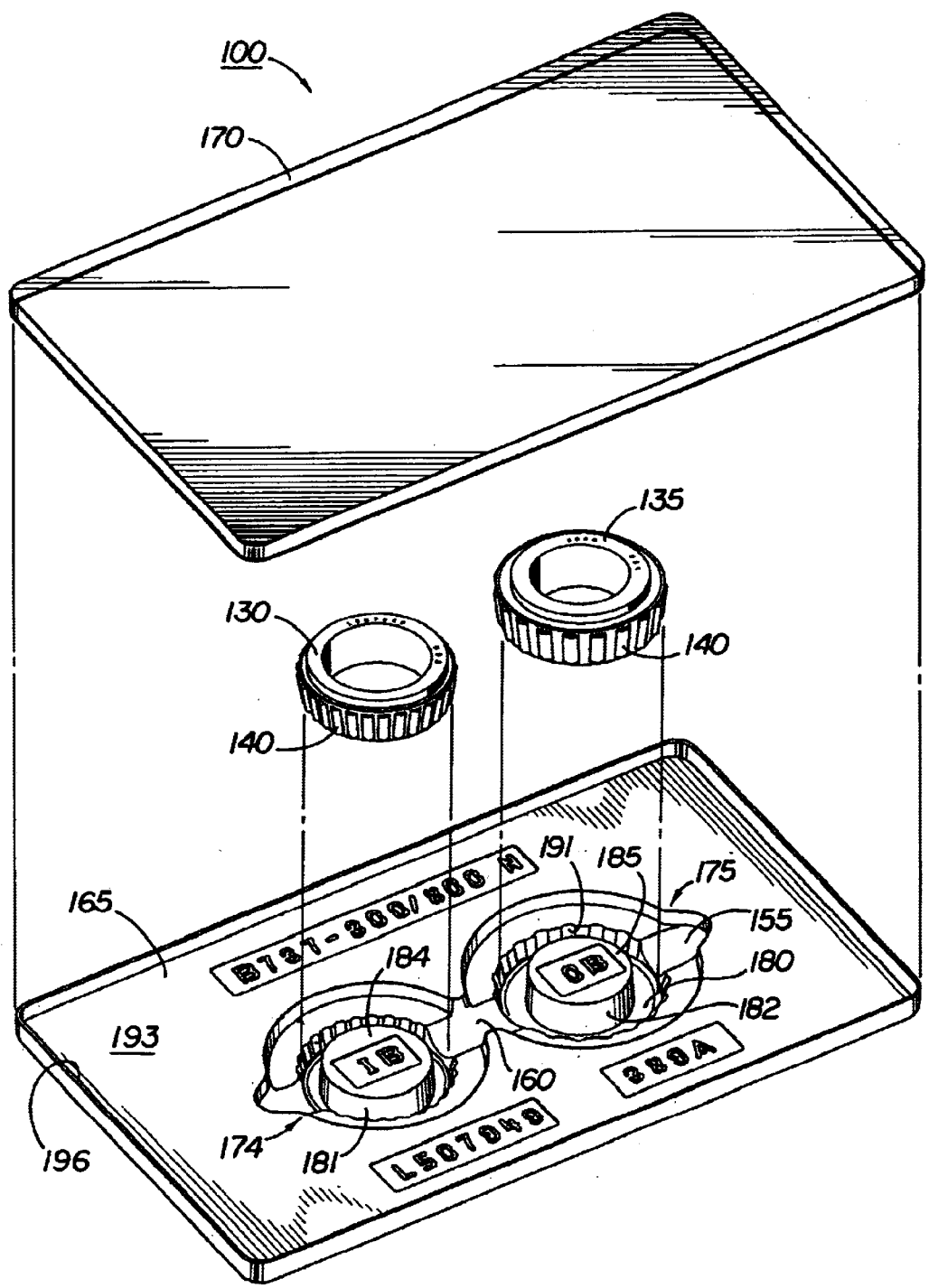
FIG. 2A illustrates an exploded view of an exemplary wheel bearing mold showing the cover, the wheel bearings and the recesses in which the wheel bearings rest.

FIG. 2A illustrates an exploded view of an exemplary wheel bearing mold comprising the base 165, wheel bearings 130 and 135, and the cover 170. In this view, the recess bottom surface 180 can be viewed because the bearing 135 is not in the recess 175. The recess outer wall 191 can also be seen. The indentations of the recess outer wall 191 correspond to the rollers 140 of bearing 135, such that only one type of bearing can fit in the recess 175. When the correct bearing 135 is placed in recess 175, the bearing 135 fits securely in the recess 175 and the top surface of the bearing 135 is level with the hub top surface 185. This design allows the mechanic to be certain that the correct wheel bearing will be installed in the aircraft wheel assembly. The illustration of FIG. 2A also shows that the outer finger recesses 155 and 160 are contiguous with the recess bottom surface 180.

Figure 2B:
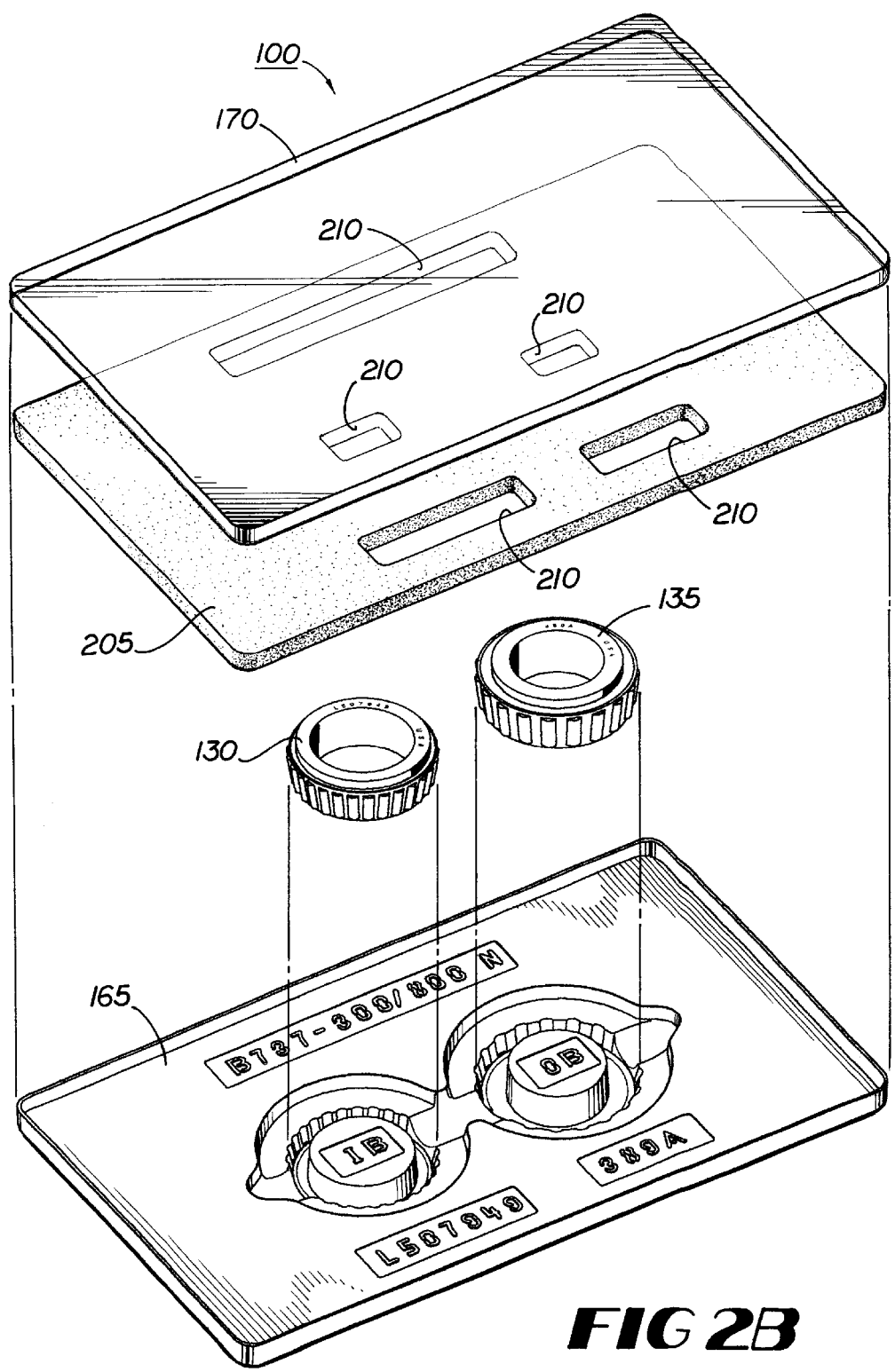
FIG. 2B illustrates an exploded view of an exemplary wheel bearing mold with a protective material placed between the cover and the top surface of the wheel bearing mold.

Referring to FIG. 2B, another exploded view of an exemplary embodiment of the invention is illustrated. FIG. 2B shows the addition of a packing element 205 into the wheel bearing mold 100. The packing element 205 is inserted between the base 165 and the cover 170. The packing element 205 can serve as a cushion to protect the wheel bearings during storage or transport of the wheel bearing mold. The packing element 205 also comprises cut-outs 210. The cut-outs 210 enable one to view the aircraft model number, the bearing serial numbers, and the inboard and outboard designations without actually opening the packed wheel bearing mold 100. The wheel bearing mold serves as a useful device for storing used wheel bearings. In an aircraft machine shop, wheel assemblies are typically taken apart and inspected periodically. When the wheel bearings are removed from a wheel assembly, they are generally cleaned, inspected, and if in good condition, are stored for use in another wheel assembly. The mold also serves as a useful container for storing and shipping new wheel bearings from a manufacturer.

Figure 3:
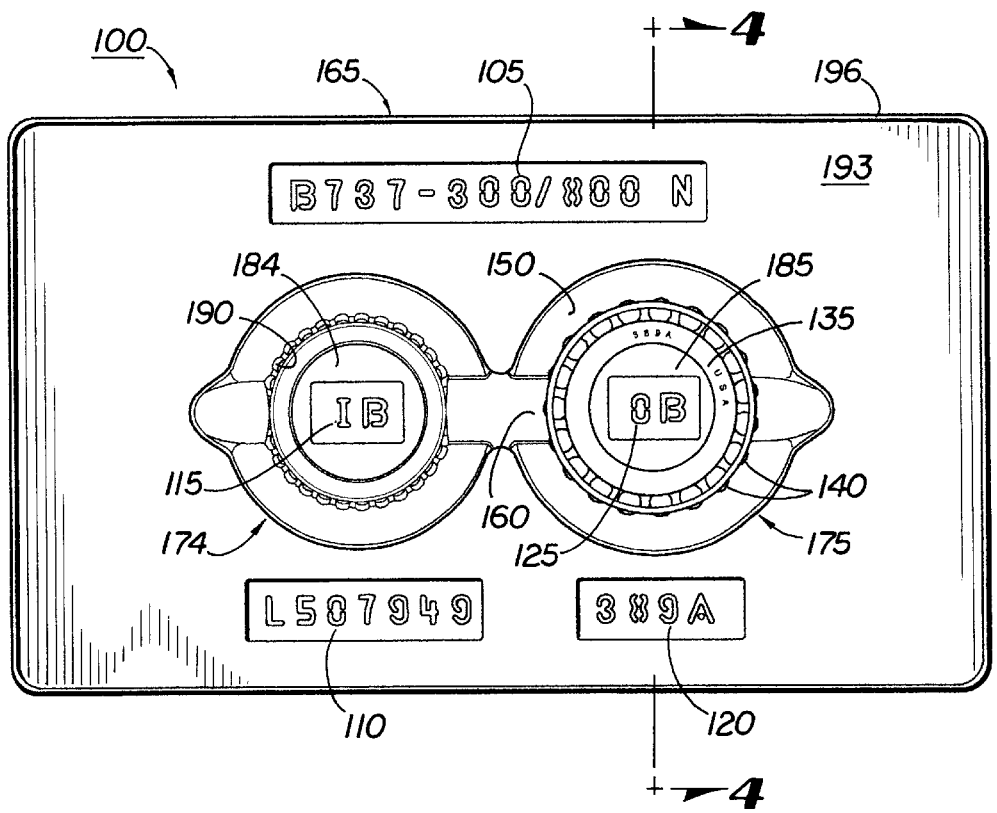
FIG. 3 illustrates a top view of an exemplary wheel bearing mold with cross-section line 4.
Figure 4:
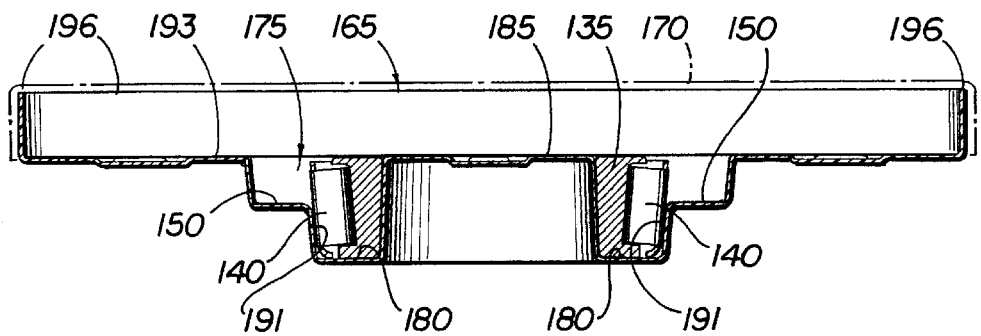
FIG. 4 illustrates a cross-sectional view along line 4 of the exemplary wheel bearing mold in FIG. 3.

FIG. 3 illustrates a top view of an exemplary embodiment of the present invention. FIG. 3 shows a packed wheel bearing mold 100 with a section line 4 running through the outboard bearing 135. FIG. 4 illustrates a cross-section of the packed wheel bearing mold along section line 4 shown in FIG. 3. In particular, FIG. 4 illustrates a cross-section of the wheel bearing 135 with rollers 140 as it sits in the recess 175. The rollers 140 fit within the contours of the recess outer wall 191. The illustration in FIG. 4 shows that hub top surface 185 is flush with the top of the bearing 135 when the correct size bearing is placed in the proper recess 175. If an incorrect bearing was placed in this mold, the bearing would not rest properly in the recess 175 and surface 185 would not be flush with the top surface of the bearing 135.

Figure 5:
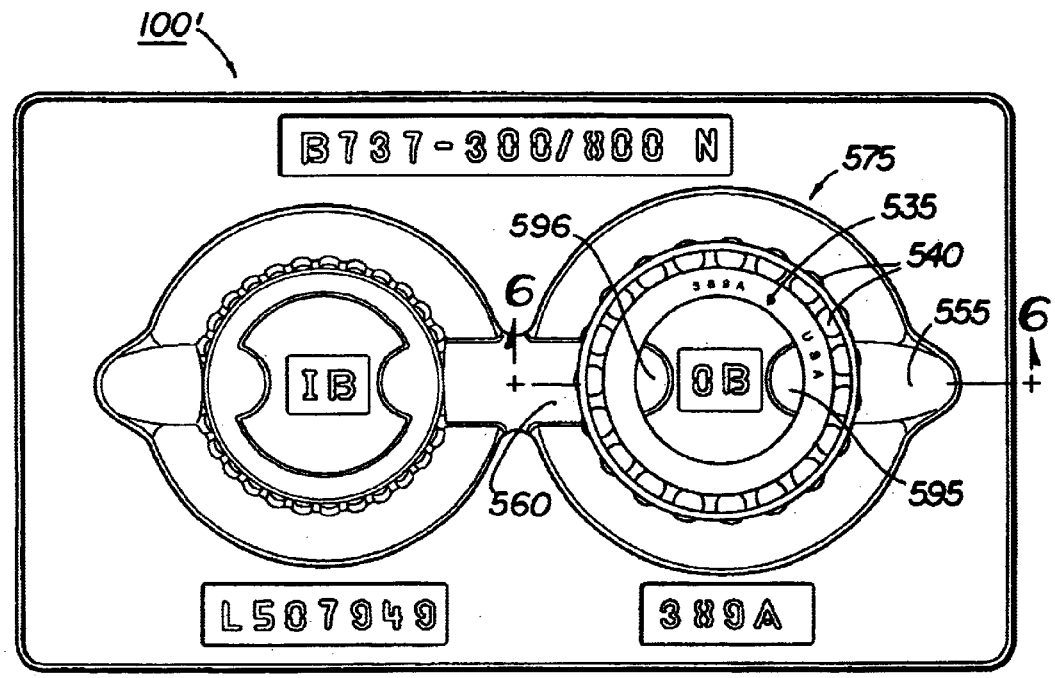
FIG. 5 illustrates a top view of an exemplary wheel bearing mold with cross-section line 6.

The exemplary wheel bearing mold 100' shown in FIG. 5 is designed for relatively larger wheel bearings than the embodiment shown in FIGS. 1 through 4. The exemplary embodiment illustrated in FIG. 5 comprises many of the features shown in FIGS. 1 through 4, but with the addition of interior finger notches 595 and 596. The use of interior finger notches 595 and 596 allows one to pick up wheel bearing 535 using both hands. It can be helpful to use two hands to pick up a wheel bearing when it is relatively heavy and has a coating of grease on it.

Figure 6:
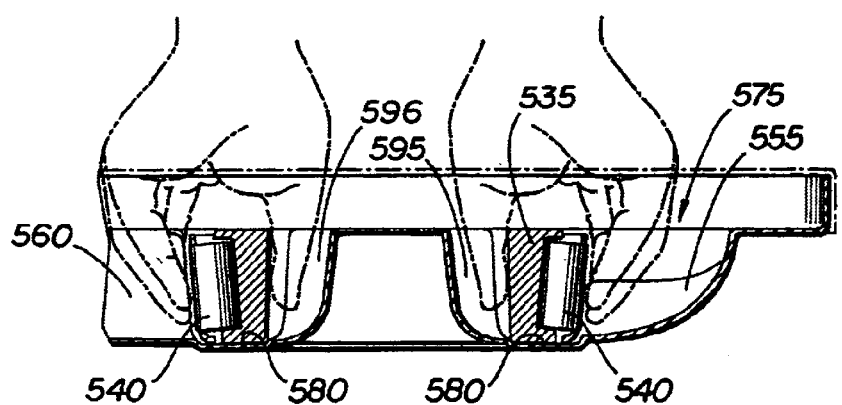
FIG. 6 illustrates a cross-sectional view along line 6 of the exemplary wheel bearing mold in FIG. 5.

FIG. 6 is a cross-section view taken from the exemplary embodiment of the invention illustrated in FIG. 5. The cross-section view shown in FIG. 6 is taken along line 6 shown in FIG. 5. The illustration in FIG. 6 shows a pair of hands picking up a wheel bearing from the wheel bearing mold 100'. The thumbs are inserted into interior finger notches 595 and 596. One or more of the remaining fingers are inserted into the outer finger notches 555 and 560. In this embodiment, both the interior finger notches 595 and 596 and the outer finger notches 555 and 560 are contiguous with bottom recess surface 580 so as to reduce vacuum between the wheel bearing and the bottom recess surface 580.

Figure 7A:
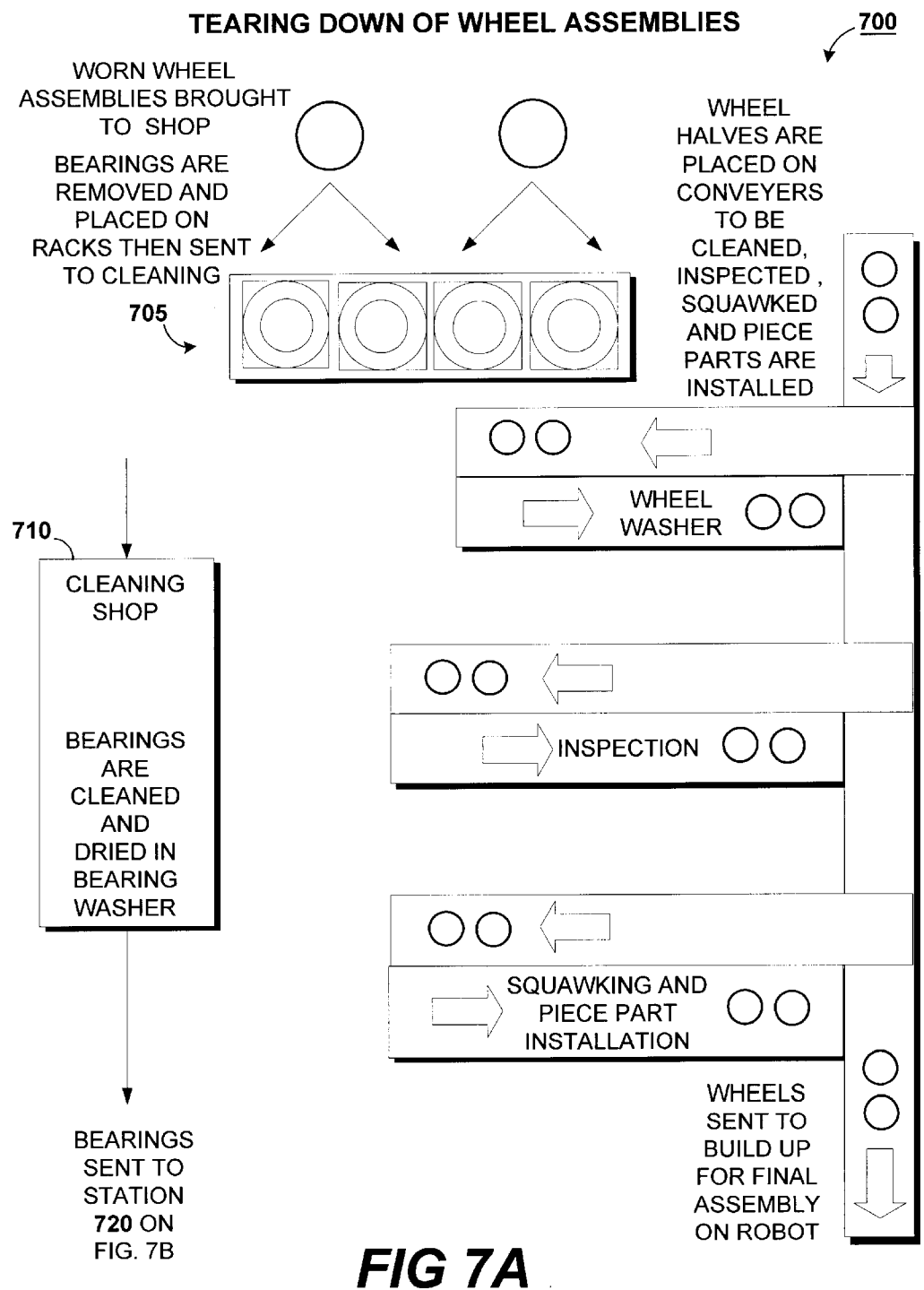
FIG. 7A is a block diagram illustrating an exemplary environment for operating the invention where aircraft wheel assemblies are taken apart by mechanics.
Figure 7B:
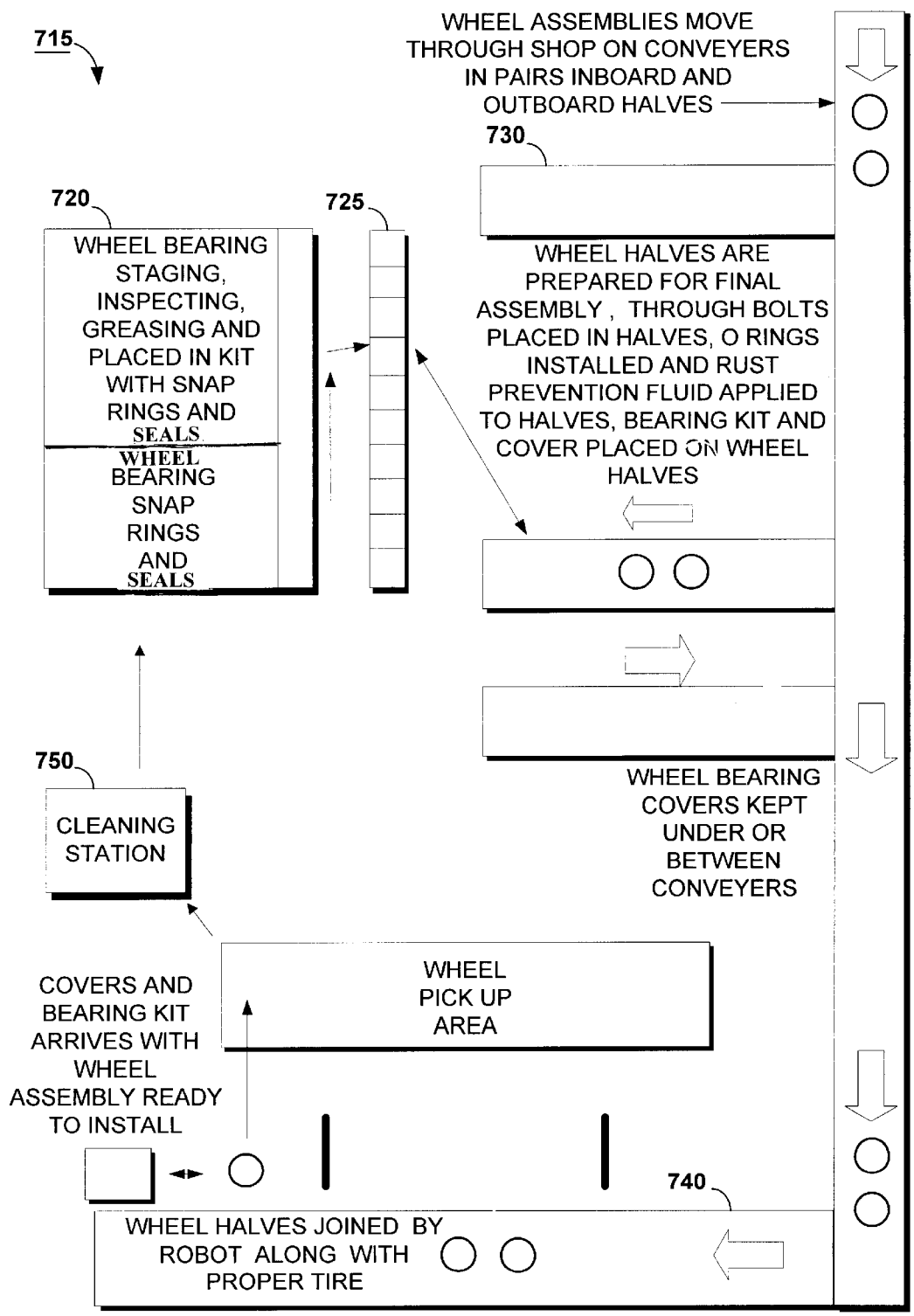
FIG. 7B is a block diagram illustrating an exemplary environment for operating the invention where aircraft wheel assemblies are constructed by mechanics.

FIGS. 7A and 7B illustrate block diagrams of exemplary operating environments 700 and 715 in which aircraft mechanics can use the present invention. At station 705, in the exemplary environment 700 of FIG. 7A, wheel assemblies from planes that are being serviced arrive in the wheel shop. A mechanic takes the wheel assembly apart and removes the inboard and outboard wheel bearings. At station 710 the wheel bearings taken from wheel assemblies are cleaned at a cleaning shop. Once the wheel bearings are cleaned and dried, they are sent on to the bearing packing station 720 in the exemplary environment 715 shown in FIG. 7B. An alternative source of bearings can be new bearings arriving from the bearing manufacturer. At the bearing packing station 720, a mechanic inspects the bearings. If the bearings are in satisfactory condition, a new coat of grease is applied and the mechanic places the bearings in the appropriate bearing molds. In one embodiment of the present invention, snap rings and seals can also be placed with the bearing in the mold. Once the mold is packed and covered it is stored until needed by the mechanics. Typically, the bearing molds can be stored in vertical racks 725 designed for storing multiple bearing molds. Each rack corresponds to one aircraft model and only holds bearings for that model.

When a mechanic is preparing a new wheel assembly at station 730, he can pull the correct mold with the correct wheel bearings from the rack 725 and verify the aircraft model number printed on the mold. The wheels and packed wheel bearing mold travel on a conveyor to station 740. At station 740, the wheel bearings are removed from the mold and placed in the wheel assembly. The packaged wheel assemblies are sent to the pick up area and later are incorporated into aircraft. The mechanics can send empty molds from station 740 to a cleaning station 750 where the molds are cleaned. A mechanic at the bearing packing station 720 receives the cleaned empty molds from the cleaning station 750 for packing more bearings. In alternative embodiments of the present invention, the stations shown in FIGS. 7A and 7B can be rearranged into other configurations.

Figure 8:
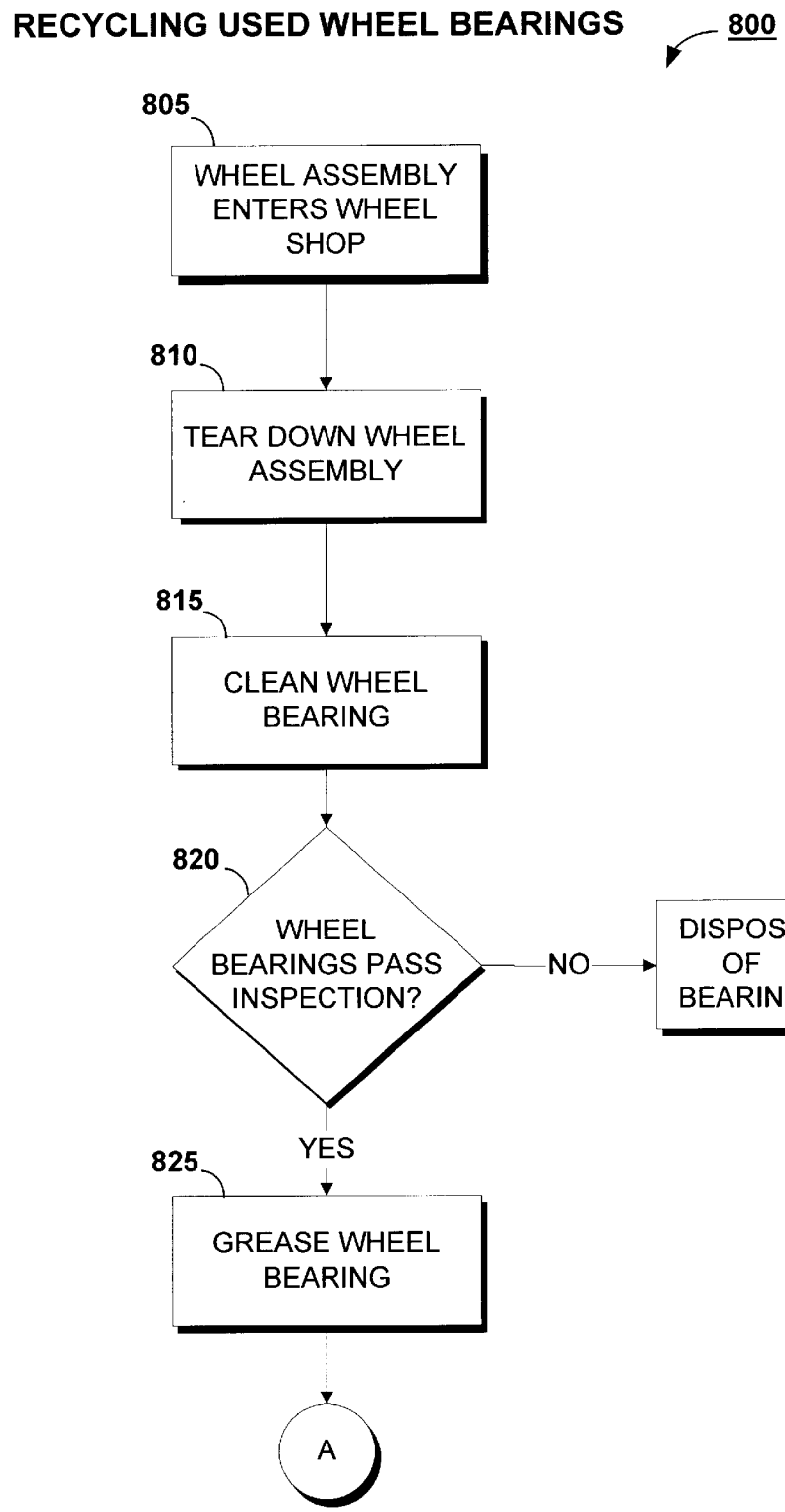
FIG. 8 is a logic flow diagram illustrating an exemplary process for recycling used wheel bearings.

The logic flow diagrams illustrated in FIGS. 8, 9, 10, and 11, are exemplary processes describing in greater detail the events occurring in the operating environment illustrated in FIGS. 7A and 7B. Referring to FIG. 8, an exemplary process 800 for recycling used wheel bearings using the wheel bearing mold is illustrated. In step 805, a wheel assembly from a plane that is being serviced enters the wheel shop. The wheel assembly is separated from the plane before entering the wheel shop. In step 810, a mechanic takes the wheel assembly apart and removes the wheel bearings. In step 815, the wheel bearings are cleaned and dried at station 710. A mechanic inspects the wheel bearings in step 820 to see if they can be used again in another wheel assembly. If the wheel bearing is in satisfactory condition the "Yes" branch is followed to step 825, where the wheel bearing is given a new coating of grease. If the wheel bearing is not in satisfactory condition, the "No" branch is followed and the bearing is disposed of. After the wheel bearing is greased in step 825, it is ready for packing in a mold. The packing process is illustrated in greater detail in FIG. 10.

Figure 9:
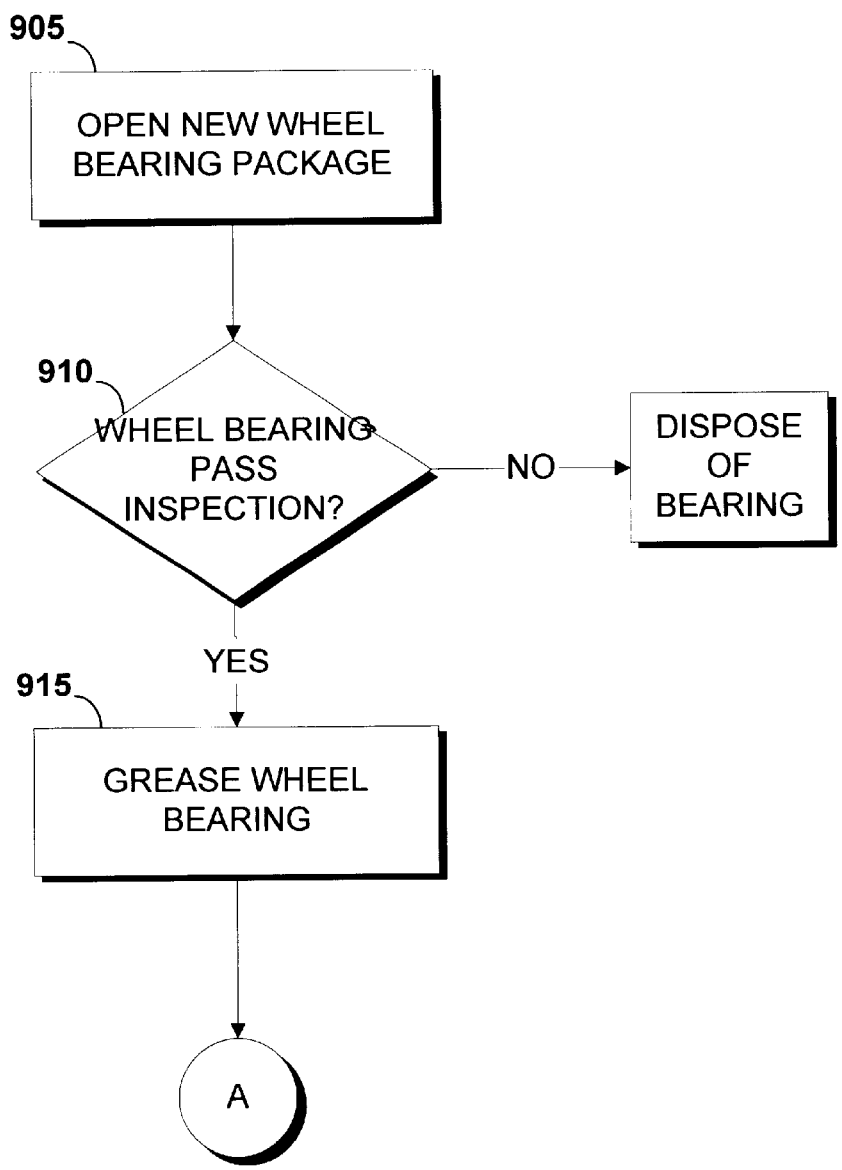
FIG. 9 is a logic flow diagram illustrating an exemplary process for incorporating new wheel bearings.

FIG. 9 illustrates an exemplary process 900 for incorporating new wheel bearings, received from the manufacturer, into the bearing mold process. If a particular type of bearing was needed and none was available from the cleaning station 710, a mechanic at the bearing packing station 720 could open a new wheel bearing package from the manufacturer in step 905. In an alternative embodiment of the present invention, the wheel bearing mold can comprise the package for a wheel bearing shipped from a manufacturer. In step 910, the mechanic would inspect the wheel bearing to insure that it was not damaged in the shipment from the manufacturer. If the wheel bearing is not in satisfactory condition, it is disposed of. If the wheel bearing is in satisfactory condition, the "Yes" branch is followed to step 915 and the mechanic applies a coat of grease to the wheel bearing. The wheel bearing is then ready for packing into a mold as illustrated in FIG. 10.

Figure 10:
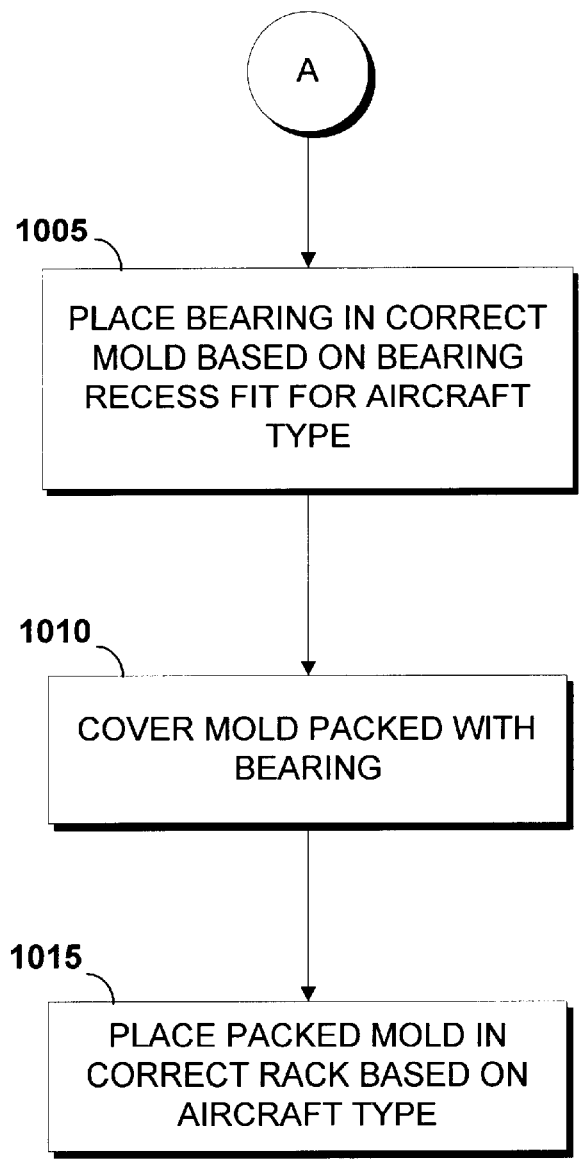
FIG. 10 is a logic flow diagram illustrating an exemplary process for packing wheel bearings into molds.

The logic flow diagram illustrated in FIG. 10 is an exemplary method 1000 for packing the wheel bearings into the correct molds. The process 1000 illustrated in FIG. 10 continues from the processes illustrated separately in FIG. 8 and FIG. 9. In step 1005, the mechanic places the greased wheel bearing into the recess 175 of the correct mold. Because only one type of bearing fits in each recess 175 of a mold, the mechanic can easily and readily determine whether he has placed the correct wheel bearing in the correct mold. In step 1010, the mold packed with the wheel bearing is covered in order to protect the wheel bearing from contamination. In one embodiment of the present invention, the cover 170 is clear so that a mechanic can easily see the bearing type, the serial number, and the aircraft model number on the mold base 165. In another embodiment of the present invention, the protective element 205 is placed between the mold base 165 and the cover 170. The protective element 205 can serve as a cushion to protect the wheel bearings during storage or shipping. In step 1015, the mold packed with the correct bearing is placed in a rack 725. Typically, each rack is labeled with an aircraft model number and only holds wheel bearing molds for that model. The molds packed with wheel bearings are stored in the racks until needed for installation into wheel assemblies.

Figure 11:
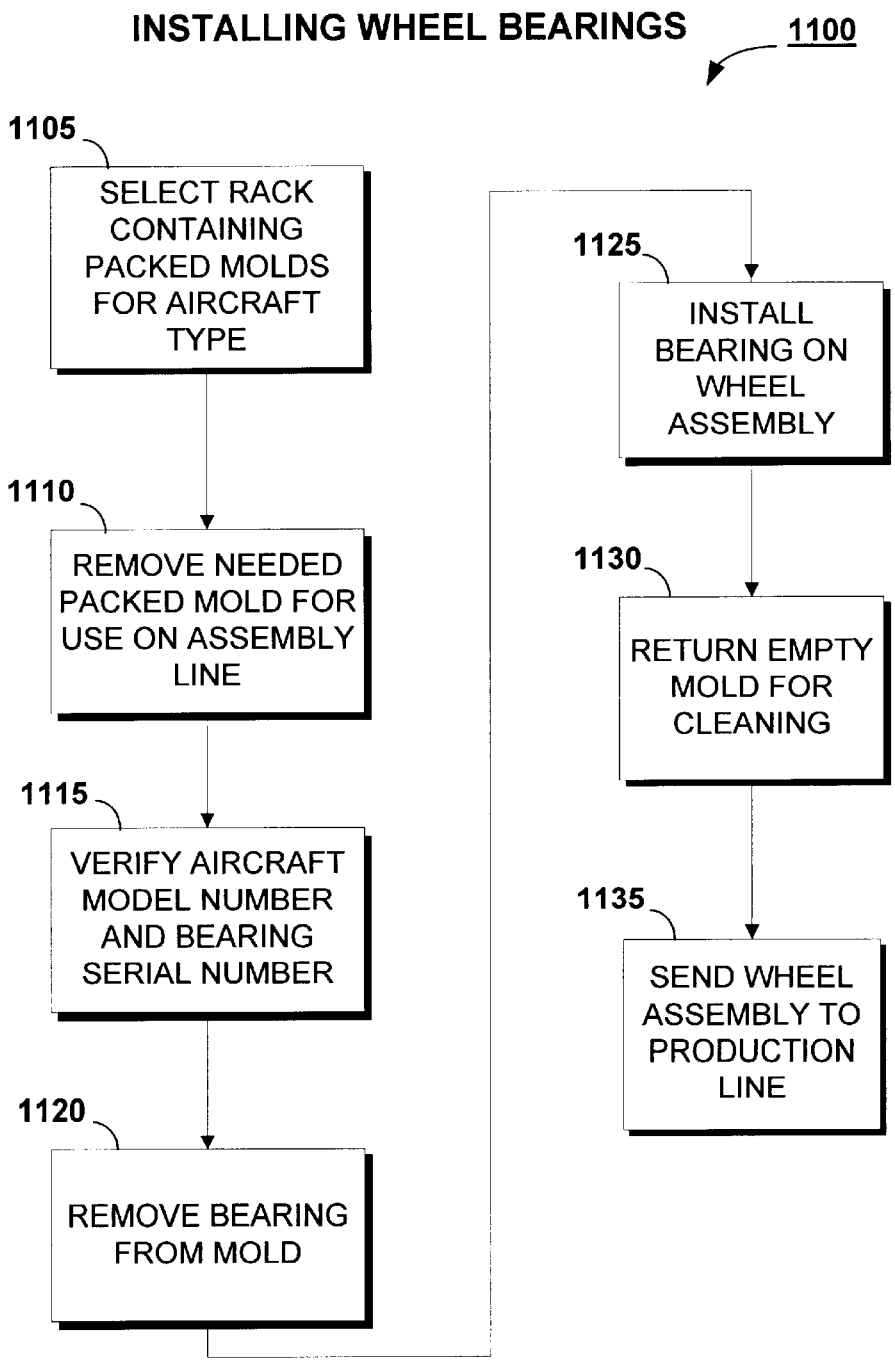
FIG. 11 is a logic flow diagram illustrating an exemplary process for installing a wheel bearing into a wheel assembly.

FIG. 11 illustrates an exemplary process 1100 for installing the wheel bearings. In step 1105, a mechanic chooses a rack of wheel bearing molds according to the model number of the aircraft wheel assembly he is working on. The racks 725 can be easily identified by placing the aircraft model numbers on each rack. In step 1110, the mechanic removes a wheel bearing mold from the selected rack. In step 1115, the mechanic verifies the aircraft model number on the mold and the serial number on the bearing and the mold. In step 1120, the bearing is removed from the mold. The mold is designed with finger holds that facilitate removal of the bearing from the mold. The bearing is installed on the wheel assembly in step 1125 at mounting station 740. The mechanic can return the empty mold in step 1130 to the cleaning station 750 so that the mold can be cleaned and used again. In step 1135, the completed wheel assembly is shipped on to the production line for incorporation into an aircraft. The foregoing processes illustrated in FIGS. 8, 9, 10, and 11 represent only a single exemplary method for employing the wheel bearing mold.

Figure 12:
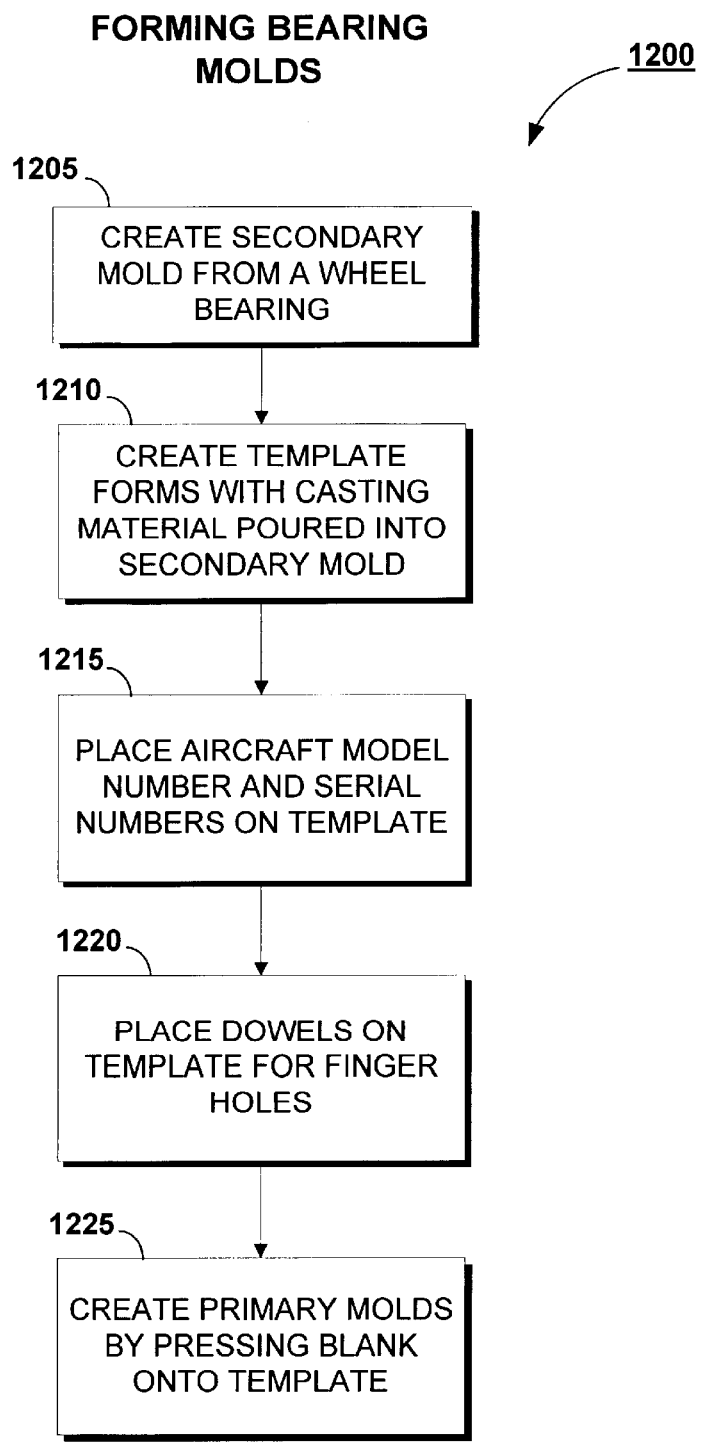
FIG. 12 is a logic flow diagram illustrating an exemplary process for forming bearing molds.

Production of the individual molds is a separate process that occurs before the molds can be implemented in the operating environments 700 and 715 of FIGS. 7A and 7B. The manufacturer of the molds can be an airline, a bearing manufacturer, or some other party. Referring to FIG. 12, an exemplary method 1200 for creating the molds is illustrated. The method 1200 begins with step 1205, where a secondary mold is created from the wheel bearing. Typically, the secondary mold is created by taking a heated piece of plastic and stamping the plastic on top of the bearing so that the bearing creates a matching recess in the plastic. In step 1210, the manufacturer pours a casting material into the secondary mold to create a replica of the bearing. The replica is the first portion of a template that will be used in producing the final mold. In step 1215, additional features such as the aircraft model number, bearing serial number, and bearing type can be added to the template. Typically, these features are implemented in the template by engraving or embossing the desired characters on plates that are mounted on the template. In step 1220, the manufacturer can mount dowels onto the template to create outer finger notches 155 and 160 and interior finger notches 595 and 596. Finally, in step 1225, the manufacturer presses the primary molds for the wheel shop using the template. Molds can be pressed from a variety of materials including, but not limited to, plastic and sheet metal.

In conclusion, the present invention facilitates installation of the correct wheel bearings in aircraft wheel assemblies. The wheel bearing mold is designed so that a mechanic can easily recognize a wheel bearing of incorrect size. Markings on the mold can clearly identify the bearing and the type of aircraft in which it should be used. The mold also serves as an efficient and convenient means for storing and shipping wheel bearings.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof. The above description and accompanying figures set forth an exemplary wheel bearing mold and the use of that mold by the air transportation industry. However, wheel bearing molds may be used in other fields beyond aircraft, such as commercial trucking, to ensure that the correct wheel bearing is installed in a wheel assembly. Furthermore, the present invention can be applied to other parts of machinery where the dimensions of the parts are not easily discernible, such as gears, bolts, fasteners, and cutting tools.

What is claimed is:

1. An apparatus to facilitate identification of a wheel bearing having a certain size comprising:
    a mold comprising a top surface, a bottom surface, and a form region,
        the top surface comprising a first marking identifying a wheel bearing model number and a second marking identifying a type of vehicle in which the wheel bearing is installed,
        the form region comprising,
            a form bottom surface substantially parallel to the top surface,
            an outer wall contiguous with the top surface and the form bottom surface, the outer wall having a contoured surface and a generally cylindrical shape, the contoured surface designed to fit rollers of only the wheel bearing having the certain size, and
            a hub disposed within the outer wall and between the top surface and the form bottom surface, the hub comprising
                a hub top surface substantially parallel to the top surface and
                an inner wall contiguous with the hub top surface and the form bottom surface and having a generally cylindrical shape.

2. The apparatus of claim 1, wherein the mold comprises a plastic material.

3. The apparatus of claim 1, wherein the mold further comprises a removable cover that attaches to the top surface of the mold.

4. The apparatus of claim 3, wherein a protective material is placed between the top surface of the mold and the removable cover.

5. The apparatus of claim 1, wherein the top surface further comprises a rim around the perimeter of the mold.

6. The apparatus of claim 1, wherein the outer wall and the hub are disposed to measure an outer diameter and an inner diameter of the wheel bearing simultaneously.

7. The apparatus of claim 1, wherein the contoured surface of the outer wall is shaped to prevent a wheel bearing having a size different from the certain size from properly fitting in the form region.

8. A method for storing a wheel bearing using a wheel bearing mold to facilitate use of the appropriate-sized wheel bearing in a vehicle comprising:
    placing the wheel bearing in the wheel bearing mold, wherein the wheel bearing mold is designed with a recess comprising an inner hub and an outer contoured surface such that only one size of wheel bearing properly fits in the wheel bearing mold;
    verifying that the correct size wheel bearing is placed in the wheel bearing mold by checking that a wheel bearing serial number and a vehicle model identifier on the wheel bearing mold correspond to the wheel bearing; and
    covering the wheel bearing mold to protect the wheel bearing and create a packaged wheel bearing.

9. The method of claim 8, further comprising the step of shipping the packaged wheel bearing from a manufacturer of the wheel bearing to a purchaser.

10. The method of claim 8, further comprising the step of storing the packaged wheel bearing for later installation in the vehicle.

11. The method of claim 8, further comprising the step of storing the packaged wheel bearing in a rack comprising packaged wheel bearings of the same size.

12. The method of claim 8, further comprising the step of applying grease to the wheel bearing before placing it in the wheel bearing mold.

13. A method for installing the appropriate-size wheel bearing in a vehicle using a wheel bearing mold, comprising the steps of:
   selecting a rack holding the wheel bearing mold containing wheel bearings for a vehicle;
   removing the wheel bearing mold from the rack, wherein the wheel bearing mold is designed with a recess comprising an inner hub and a contoured outer surface shaped to receive only one size of wheel bearing;
   verifying a vehicle model number and the a wheel bearing model number on the wheel bearing mold;
   removing the wheel bearing from the wheel bearing mold; and
   installing the wheel bearing in the vehicle.

14. The method of claim 13, wherein the rack holds wheel bearing molds containing wheel bearings of the same size.

15. The method of claim 13, further comprising the step of installing the wheel bearing in the wheel assembly of an aircraft.

16. The method of claim 13, further comprising the step of removing the wheel bearing using notches in the wheel bearing mold.

17. The method of claim 13, further comprising the step of placing the wheel bearing mold on an assembly line with a wheel assembly.

18. An apparatus to facilitate identification of a wheel bearing having a certain size comprising:
   a mold, comprising a top surface, a bottom surface, and a form region, wherein the dimensions of the form region are such that only the wheel bearing having the certain size can correctly fit in the form region,
   the form region comprising,
      a form bottom surface substantially parallel to the top surface,
      an outer wall contiguous with the top surface and the form bottom surface, the outer wall having a contoured surface and a generally cylindrical shape, the contoured surface designed to fit rollers of only the wheel bearing having the certain size,
      a step disposed between the top surface and the form bottom surface and further disposed outside the outer wall, the step operable for facilitating placement and removal of the wheel bearing in the form region, the step comprising
         a step surface generally parallel to the top surface and contiguous with the outer wall and
         a step wall generally parallel to the outer wall and contiguous with the step surface and the top surface; and
      a hub disposed within the outer wall and between the top surface and the form bottom surface, the hub comprising
         a hub top surface substantially parallel to the top surface and
         an inner wall contiguous with the hub top surface and the form bottom surface and having a generally cylindrical shape.

19. The apparatus of claim 8, wherein the hub top surface is level with a wheel bearing top surface when the wheel bearing having the certain size is placed in the form region.

20. The apparatus of claim 18, wherein the outer wall and the hub are disposed to measure an outer diameter and an inner diameter of the wheel bearing simultaneously.

21. The apparatus of claim 18, wherein the contoured surface of the outer wall is shaped to prevent a wheel bearing having a size different from the certain size from properly fitting in the form region.

22. An apparatus to facilitate identification of a wheel bearing having a certain size comprising:
   a mold sized to accept the wheel bearing having the certain size, the mold comprising a top surface, a bottom surface, and a form region,
   the form region comprising,
      a form bottom surface substantially parallel to the top surface,
      an outer wall contiguous with the top surface and the form bottom surface, the outer wall having a contoured surface designed to receive the rollers of only the wheel bearing having the certain size and a generally cylindrical shape, the outer wall comprising a first notch and a second notch operable for facilitating removal of the wheel bearing from the form region, and
      a hub disposed within the outer wall and between the top surface and the form bottom surface, the hub comprising
         a hub top surface substantially parallel to the top surface and
         an inner wall contiguous with the hub top surface and the form bottom surface and having a generally cylindrical shape.

23. The apparatus of claim 22, wherein the inner wall comprises a third notch and a forth notch operable for facilitating removal of the wheel bearing from the form region.

24. The apparatus of claim 23, wherein the first notch, the second notch, the third notch, and the fourth notch are contiguous with the form bottom surface so as to reduce the existence of a vacuum between the surfaces of the wheel bearing and the mold.

25. An apparatus to facilitate identification of a wheel bearing having a certain size comprising:
   a mold comprising a top surface, a bottom surface, a step, and a form region,
   the form region comprising,
      a form bottom surface substantially parallel to the top surface,
      an outer wall contiguous with the form bottom surface, the outer wall having a generally cylindrical shape and a contoured surface shaped to receive only the wheel bearing having the certain size, and
      a hub disposed within the outer wall and between the top surface and the form bottom surface, the hub comprising,
         a hub top surface substantially parallel to the top surface and
         an inner wall contiguous with the hub top surface and the form bottom surface and having a generally cylindrical shape, and
      the step disposed between the top surface and the form bottom surface and further disposed outside the outer wall, wherein the step facilitates placement and removal of the wheel bearing in the form region.

26. The apparatus of claim 25, wherein the step comprises:
   a step surface generally parallel to the top surface and contiguous with the outer wall and a step wall generally parallel to the outer wall and contiguous with the step surface and the top surface.

27. The apparatus of claim 25, wherein the contoured surface of the outer wall comprises a series of recesses.

28. The apparatus of claim 25, wherein the outer wall comprises a first notch and a second notch operable for facilitating removal of the wheel bearing from the form region.

29. The apparatus of claim 25, wherein the outer wall and the hub are disposed to measure an outer diameter and an inner diameter of the wheel bearing simultaneously.

30. An apparatus to facilitate identification of a wheel bearing having a certain size comprising:
   a mold comprising a top surface, a bottom surface, and a form region,
      the form region comprising,
         a form bottom surface substantially parallel to the top surface,
         an outer wall contiguous with the top surface and the form bottom surface, the outer wall having a generally cylindrical shape, comprising a first notch contiguous with the form bottom surface and a second notch contiguous with the form bottom surface, and further comprising a contoured surface designed to receive the rollers of only the wheel bearing having the certain size, and
      a hub disposed within the outer wall and between the top surface and the form bottom surface, the hub comprising,
         a hub top surface substantially parallel to the top surface and
         an inner wall contiguous with the hub top surface and the form bottom surface and having a generally cylindrical shape.

31. The apparatus of claim 30, wherein the inner wall comprises a third notch and a fourth notch for facilitating removal of the wheel bearing from the form region.

32. The apparatus of claim 31, wherein the third notch is contiguous with the form bottom surface and the fourth notch is contiguous with the form bottom surface.

33. The apparatus of claim 30, wherein the outer wall and the hub are disposed to measure an outer diameter and an inner diameter of the wheel bearing simultaneously.

34. The apparatus of claim 30, further comprising a step disposed between the top surface and the form bottom surface and further disposed outside the outer wall, wherein the step facilitates placement and removal of the wheel bearing in the form region.

35. A method for storing a wheel bearing using a wheel bearing mold to facilitate use of an appropriate-sized wheel bearing in a vehicle comprising:
   placing the wheel bearing in the wheel bearing mold, wherein the wheel bearing mold comprises an inner hub and a contoured outer wall that allow only the appropriate-sized wheel bearing to properly fit in the wheel bearing mold; and
   verifying that the appropriate-sized wheel bearing is placed in the wheel bearing mold by determining whether the wheel bearing properly fits in the wheel bearing mold and checking that a wheel bearing serial number and a vehicle model identifier on the wheel bearing mold correspond to the wheel bearing.

36. A method for storing a wheel bearing using a wheel bearing mold to facilitate use of an appropriate-sized wheel bearing in a vehicle comprising:
   placing the wheel bearing in the wheel bearing mold, wherein the wheel bearing mold comprises an inner hub and a contoured outer wall that allow only the appropriate-sized wheel bearing to properly fit in the wheel bearing mold;
   verifying that the appropriate-sized wheel bearing is placed in the wheel bearing mold by determining whether the wheel bearing properly fits in the wheel bearing mold; and
   removing the wheel bearing from the wheel bearing mold, wherein a step feature in the wheel bearing mold facilitates removing the wheel bearing.

37. A method for storing a wheel bearing using a wheel bearing mold to facilitate use of an appropriate-sized wheel bearing in a vehicle comprising:
   placing the wheel bearing in the wheel bearing mold, wherein the wheel bearing mold comprises an inner hub and a contoured outer wall that allow only the appropriate-sized wheel bearing to properly fit in the wheel bearing mold;
   verifying that the appropriate-sized wheel bearing is placed in the wheel bearing mold by determining whether the wheel bearing properly fits in the wheel bearing mold; and
   removing the wheel bearing from the wheel bearing mold, wherein a notch feature in the wheel bearing mold facilitates removing the wheel bearing.

38. A method for storing a wheel bearing using a wheel bearing mold to facilitate use of the appropriate-sized wheel bearing in a vehicle comprising:
   placing the wheel bearing in the wheel bearing mold, wherein the wheel bearing mold is designed with a recess comprising an inner hub and an outer contoured surface such that only one size of wheel bearing properly fists in the wheel bearing mold;
   verifying that the correct size wheel bearing is placed in the wheel bearing mold;
   covering the wheel bearing mold to protect the wheel bearing and create a packaged wheel bearing; and
   removing the wheel bearing from the wheel bearing mold, wherein a step feature in the wheel bearing mold facilitates removing the wheel bearing.

39. A method for storing a wheel bearing using a wheel bearing mold to facilitate use of the appropriate-sized wheel bearing in a vehicle comprising:
   placing the wheel bearing in the wheel bearing mold, wherein the wheel bearing mold is designed with a recess comprising an inner hub and an outer contoured surface such that only one size of wheel bearing properly fits in the wheel bearing mold;
   verifying that the correct size wheel bearing is placed in the wheel bearing mold;
   covering the wheel bearing mold to protect the wheel bearing and create a packaged wheel bearing; and
   removing the wheel bearing from the wheel bearing mold, wherein a notch feature in the wheel bearing mold facilitates removing the wheel bearing.

* * * * *

UNITED STATES PATENT AND TRADEMARK OFFICE
CERTIFICATE OF CORRECTION

PATENT NO. : 6,688,015 B2  Page 1 of 1
DATED : February 10, 2004
INVENTOR(S) : Harry E. Schroeder and James M. Patterson It is certified that error appears in the above-identified patent and that said Letters Patent is hereby corrected as shown below:

Column 9,
Line 65, "19. The apparatus of claim 8, wherein the hub top surface" should read
-- 19. The apparatus of claim 18, wherein the hub top surface --

Signed and Sealed this

Twentieth Day of April, 2004

JON W. DUDAS
*Acting Director of the United States Patent and Trademark Office*